(12) United States Patent
Loy et al.

(10) Patent No.: US 7,930,053 B2
(45) Date of Patent: Apr. 19, 2011

(54) VIRTUAL PLATFORM TO FACILITATE AUTOMATED PRODUCTION

(75) Inventors: Wee Song Steve Loy, Singapore (SG); Wei Chak Joseph Lam, Singapore (SG)

(73) Assignee: Beacons Pharmaceuticals Pte Ltd, Singapore (SG)

( * ) Notice: Subject to any disclaimer, the term of this patent is extended or adjusted under 35 U.S.C. 154(b) by 1217 days.

(21) Appl. No.: 10/707,605

(22) Filed: Dec. 23, 2003

(65) Prior Publication Data

US 2005/0137735 A1    Jun. 23, 2005

(51) Int. Cl.
*G06F 19/00* (2006.01)
*G01N 1/18* (2006.01)

(52) U.S. Cl. .............. 700/109; 700/96; 702/82

(58) Field of Classification Search ............ 700/96, 700/108, 109, 110; 702/81, 82, 84
See application file for complete search history.

(56) References Cited

U.S. PATENT DOCUMENTS

| | | | |
|---|---|---|---|
| 5,262,954 | A | 11/1993 | Fujino et al. |
| 5,366,896 | A * | 11/1994 | Margrey et al. ............ 436/48 |
| 5,978,578 | A | 11/1999 | Azarya et al. |
| 6,032,208 | A | 2/2000 | Nixon et al. |
| 6,236,994 | B1 | 5/2001 | Swartz et al. |
| 6,456,955 | B1 | 9/2002 | Andrews et al. .......... 702/104 |
| 6,501,995 | B1 | 12/2002 | Kinney et al. |
| 7,082,345 | B2 * | 7/2006 | Shanmugasundram et al. ........................ 700/121 |
| 2002/0199082 | A1 * | 12/2002 | Shanmugasundram et al. ........................ 712/208 |
| 2003/0055941 | A1 | 3/2003 | Genin et al. |
| 2003/0083756 | A1 | 5/2003 | Hsiung et al. |

OTHER PUBLICATIONS

H. Giese et al, "Integrating Verification in a Design Process for Distributed Production Control Systems," Proceedings of the 2nd International Workshop on Integration of Specification Techniques for Applications in Engineering (INT2002), Grenoble, France, Apr. 2002, pp. 105-115.

FDA Center for Drug Evaluation and Research (CDER), "Guide to Inspection of Computerized Systems in Drug Processing", Feb. 1983.

Elsie Jatto et al, "An Overview of Pharmaceutical Validation and Process Controls in Drug Development", Tropical Journal of Pharmaceutical Research, Dec. 2002, 1 (2), pp. 115-122.

* cited by examiner

*Primary Examiner* — Ryan A Jarrett
(74) *Attorney, Agent, or Firm* — Horizon IP Pte Ltd

(57) ABSTRACT

A method of automating validation in a manufacturing facility is disclosed. The method comprises defining requirements, selecting and integrating automated devices for manufacturing. A hub-box with communication links is used to integrate the automated devices. The hub-box controls and facilitates communication between automated devices. The hub-box further collects and analyzes processing data for validation of the process. By interconnecting the automated devices to a hub-box, processing data may be collected substantially real-time and accessed remotely, facilitating continuous process validation.

20 Claims, 5 Drawing Sheets

VIRTUAL PLATFORM TO FACILITATE AUTOMATED PRODUCTION

BACKGROUND OF INVENTION

Automation in manufacturing facilities is becoming increasingly more popular. Typically, numerous devices or equipment for performing different functions are involved to produce a product. These devices can be supplied by various equipment manufacturers, each utilizing a proprietary protocol of its respective equipment manufacturer. The different proprietary protocols require customization (e.g., software) for automation. Production of the product begins once the production line is validated.

One problem with conventional automation systems is their inflexibility and inefficiency in adapting over time to arising or changing needs. For example, changes in automated devices, either manufacturer or model, will often require a complete automation software revision, reconfiguration and re-validation of the entire system. This is both costly and time consuming. As a result, manufacturers are reluctant to make any type of changes in the production line (e.g., replacement, removal or addition of equipment, upgrading, relocating, or expansion). The inflexibility of conventional automated systems also impedes the adoption of new technology in certain highly regulated industry such as the application of Process Analytical Technology (PAT) to be introduced to the pharmaceutical industry.

Good change controls for the replacement of the equipment from one type to another are integral in quality assurance of production facilities, especially in highly regulated industries such as life sciences, pharmaceuticals, food and beverage or healthcare. Ideally, the design of the automation system should facilitate and improve the efficiency of the change process.

Many regulatory agencies, such as the United States Food and Drug Administration (FDA), require that the drug product be tested for identity, strength, quality, purity and stability before it can be released for use. For this reason, validation should be considered whenever changes are introduced to the process or equipment. When any new equipment is adopted, steps should be taken to demonstrate its suitability for routine processing and to provide a high degree of assurance that all parts of the facility will consistently work correctly when brought into use. The defined process, using the materials and equipment specified, should be shown through, for example, documented evidence to consistently yield a product of the required quality.

However, as already discussed, conventional automation systems are not conducive to changes due to its inflexibility. Such system inflexibility requires extensive recustomization and revalidation of the entire production line when changes are desired, incurring delays as well as costs.

From the foregoing discussion, it is desirable to provide an automation system which is efficient, robust and highly adaptable to changes in order to cope with changing requirements in manufacturing to meet market demands as well as complying with regulatory standards.

SUMMARY OF INVENTION

The invention relates generally to manufacturing of a product. More particularly, the invention relates to production automation in a manufacturing facility. In one embodiment of the invention, the invention relates to a method of automating validation in a manufacturing facility. The method comprises defining requirements and selecting automated devices for manufacturing. The automated devices are integrated by interconnecting them to a hub-box via communication links. The hub-box controls and facilitates communication between automated devices. Processing data is collected from the automated devices for analysis to determine whether the requirements are satisfied. If the requirements are satisfied, the process is validated.

DETAILED DESCRIPTION

Figure 1:
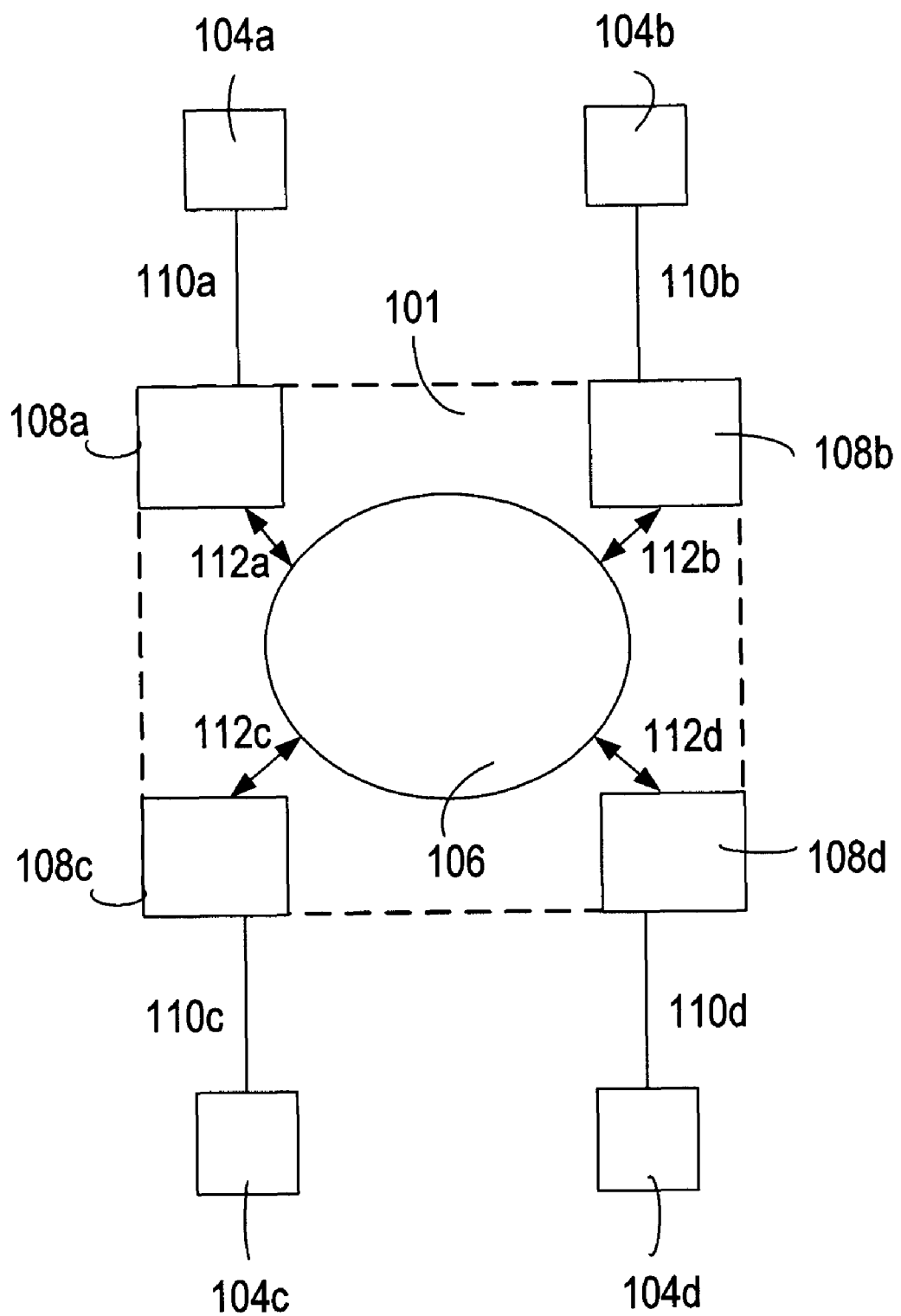
FIG. 1 shows a virtual platform in accordance with one embodiment of the invention.

The invention relates generally to manufacturing of a product. In particular, the invention relates to production automation in a manufacturing facility. FIG. 1 shows a virtual platform for production automation in accordance with one embodiment of the invention. The virtual platform integrates automated devices within the facility.

An automated device, in one embodiment, is an automated equipment of the production line. For example, the automated device may be a process manufacturing device for carrying out a production process. Other types of devices used in a manufacturing of a product, including testing or measuring devices, are also useful. It is not necessary that the automated devices within the facility be of the same type or from the same manufacturer. In fact, a facility typically comprises many types of automated devices supplied from different equipment manufacturers.

In one embodiment, the virtual platform comprises at least one hub-box 101 to which at least one automated module 104 is coupled. As illustrated, a plurality of automated modules 104a-d are coupled to the hub-box. An automated module, for example, comprises one or more automated devices. In one embodiment, the automated devices of a module form a production stage of the manufacturing line.

Alternatively, a module can include automated devices that form a production sub-stage (e.g., same production process such as mixing), more than one production stage or a complete production line, as well as other combination of automated devices. The hub can also be coupled to modules that form more than one production line for producing more than one product. Providing one production line that is used to form more than one product is also useful. Other types of automated modules are also useful. For example, an automated module may include subsystems, such as dispensary systems, laboratory systems, water systems, air systems, power systems and electrical systems.

In a pharmaceutical manufacturing process, an automated module may include automated devices for a stage of production. For example, the coating stage may include one or more tablet coaters. Additionally, the coating stage may include associated automated test device such as chromatography equipment for performing analysis on the coated tablets. The packaging stage, on the other hand, may include primary packing (e.g., blister packing) and secondary packing (e.g., carton packing) automated devices. Other combination of automated devices for pharmaceutical production can also be useful.

An automated module can also comprise a plurality of automated devices for storage of production materials, such as in-process products, work-in-progress products or finished products, serving the production manufacturing devices and/or production measuring devices (e.g., charging and discharging of production materials from one equipment to another equipment). For example, production materials are kept in an intermediate bulk container (IBC) which serves as an automated device for storage of in-process production materials. The materials inside the IBC are charged into the granulator to be granulated or discharged from the granulator to an IBC after completion of the granulation process to transfer the materials to the next step in production. Via the hub-box, communication between the IBC and process manufacturing device can be facilitated to synchronize the charging and discharging operations from and to an IBC (e.g., from the IBC to the granulator and from the granulator to the IBC).

In one embodiment, the hub-box comprises a hub 106. The hub communicates with the automated modules, controlling the operation of the automated devices, such as starting and stopping of production processes. Other types of operational functions can also be controlled by the hub. The hub can also facilitate collection and storage of processing data from the automated modules. Processing data includes, for example, critical process parameters, operating conditions, key performance indicators, measurement data and other relevant information. Other types of processing data or information, particularly those related to validation and record keeping to comply with regulations, are also useful.

In one embodiment, the hub analyzes the data for process control and/or improvement. Analysis may be performed using, for example, statistical software tools. Such statistical software tools can perform various types analysis comparing processing data from production with desired or specified data. For example, yield analysis can be performed by evaluating the amount of raw materials processed/input into a semi-finished product versus the amount of raw materials actually sampled from the semi-finished product after a process has taken place using the raw materials. Computational analysis to determine deviation of actual weight of x number of processed products (e.g., tablets) with the desired or specified weight. Other types of analysis can also be performed. Results of the analysis can be used too to adjust process parameters to improve the process. Since the results are performed on a real-time and concurrent (e.g., continuous) basis, concurrent validation of the equipment and processes can easily be achieved.

The hub-box can be used to facilitate the development of a regime of process analyses or tests to meet desired needs. In one embodiment, the process analyses satisfy specified validation and quality control requirements. Quantitative and/or qualitative analyses can be employed. The results of the analyses can be used to identify the quality of process parameters employed, enabling a detailed and in-depth understanding of the process. For example, the analyses can provide an understanding of various process parameters or variables and their effect on the process, including linking the variables with various quality attributes of the product.

Preferably, analyses comprise multi-variant analyses. The use of multi-variant analyses is advantageous, for example, to understand, calculate and project the rate of change of a parameter to determine its effect on the rate of change of related multiple parameters and/or vice versa. Since data is collected on a real-time basis, the analyses can be performed substantially simultaneously, with the results used to formulate process adjustments on a continuous and substantially real-time basis.

Various advantages are achieved though the analyses. For example, the analyses can be used to facilitate: a) dynamic adjustment of on-going processes; b) one-factor-at-a-time, trial and error experimentation of processes; c) preventing or reducing rejects, scrap, and reprocessing; d) real-time release of drug deliveries; e) increasing automation to improve operator safety and reduce human error; f) continuous processing to improve efficiency and manage variability of process critical parameters; g) use of small-scale equipment (to eliminate certain scale-up issues) and dedicated manufacturing facilities; and h) improving energy and material use when production capacity is varied. Other advantages can also be achieved through the analyses. Moreover, the analyses and information resulting from the analyses enable less restrictive regulatory approaches to manage change.

With such real-time quality assurance, the desired quality attributes are ensured through continuous assessment during manufacturing processes. Data from the current production batches can serve to validate the process and reflect the total system design concept, essentially supporting validation with each manufacturing batch concurrently as the batch is in production.

Control commands may be generated from the results of the analysis for controlling the devices or adjusting the operational parameters. The data can also be used for performing continuous real time validation of the production line. Alternatively, the data can be distributed to offline systems for analysis.

In one embodiment, the hub 106 comprises a digital data processing system to facilitate control of the automated modules as well data collection and analysis. The digital data processing system comprises, for example, one or more computers (e.g., minicomputer, microcomputer or mainframe computer). For a hub which comprises more than one processing system, they may be interconnected using a distribution system, such as a network (e.g., LAN, WAN or the Internet). In one embodiment, at least one redundant hub is provided to serve as a backup in the event of a failure in any of the operating hubs. The failure of the operating hub can be detected and the redundant hub can be mapped to provide the desired functionality. Other types of hub configurations for controlling automated modules and collecting and analyzing data are also useful. In one embodiment, a plurality of generic interface units 108*a-d* are provided. The plurality of generic interface units are each associated with its respective automated module. Providing an interface unit associated with some or all automated modules is also useful. Other configurations of generic interface units and automated modules are also useful.

The generic interface unit facilitates communication between the hub and the automated devices of the automated modules. Preferably, the generic interface unit allows automated devices from different vendors to interoperate together and communicate with the hub. As illustrated, the generic interface unit is separate from the hub. Providing a generic interface unit which is integrated as part of the hub is also useful.

In one embodiment, a generic interface unit provides communication links. Each automated device is coupled to a communication link. Providing communication links which are shared by more than one automated device is also useful. The communication links can be wired, wireless, or a combination of both. For example, some automated devices can be coupled to the generic interface units by a wired communication link while others are coupled via a wireless link. Other configurations, such as providing all wireless or all wired links, are also useful.

In one embodiment, each link communicates with the automated devices using a first communication protocol. The first communication protocol, for example, provides a set of control protocol instructions for controlling protocol-friendly devices. Since different automated devices may employ different or even proprietary protocols, the generic interface unit may comprise a plurality of first communication protocols to enable communication between it and the automated devices. The plurality of first communication protocols can comprise standard communication protocols, such as such as the Field-Bus, CANbus, Modbus, BITBUS, WorldFIP, Profibus, MAP or proprietary protocols of equipment manufacturers. Other types of communication protocols are also useful. It is understood that not all links of the generic interface units necessarily have the same type of communication protocols. The communication protocols employed will depend on the automated devices with which the links communicate.

The generic interface unit can comprise a plurality of different types of communication links with different first communication protocols 110a-d to accommodate different types of automated devices. Preferably, the generic interface unit comprises a plurality of changeable communication links, which can be varied to communicate with the desired first communication protocol, depending on the automated device with which it communicates. The communication protocols can be varied manually (e.g., switches or connectors) or automatically (e.g., software which detects the type of automated device connected thereto). Other techniques for automatically detecting the type of automated devices, such as hardware or a combination of hardware and software, are also useful.

The generic interface unit, in one embodiment, includes a process controller that communicates with the programmable logic controllers (PLCs) or digital data processing systems (not shown) residing in the automated equipment in the automated module. The controller facilitates operational control of the automated devices. For example, the controllers serve as a communicating interface or interpreter between the PLCs of the equipment and hub-box. Other types of controllers, such as analog-to-digital converters, depending on the application, are also useful.

In one embodiment, at least one controller is provided for each automated device. Alternatively, one controller is provided for each communication link. Other configurations of controllers, such as using one controller to control multiple automated devices or associated with multiple communication links is also useful. Other types of hardware controllers, such as electrical controllers or building management controllers for controlling other types of equipment, are also useful.

In one embodiment, the generic interface unit comprises a digital data processing system for controlling or communicating with the automated devices. The digital processing system can be in conjunction with or in lieu of the controllers. For such applications, the communication link can be wired (e.g., Ethernet) or wireless. The digital data processing system includes, for example, at least one computer, embedded processor or microcontroller. Other types of configurations are also useful.

In one embodiment, the generic interface units and the hub communicate using a second communication protocol 112a-d. The second communication protocol comprises, for example, Ethernet, TCP/IP communication protocol or a combination thereof. Other types of network protocols are also useful. The hub, for example, comprises a plurality of first protocol translators, enabling the hub to communicate with the automated devices. For example, the hub detects the type of first protocol associated with an automated device and automatically translates instructions and/or information so that the hub can communicate with the device. In one embodiment, the hub-box initiates communication with the automated module and transmits information to the automated module via the generic interface unit. The automated module acts as a receiver and acknowledges the receipt of the information after transmission. In yet another embodiment, the automated module initiates communication with the hub-box and transmits information to the hub-box. The hub-box acts as the receiver and acknowledges the receipt of the information after transmission. In one embodiment, both the hub-box and the automated module can interchangeably act as the receiver and initiator.

Figure 2:
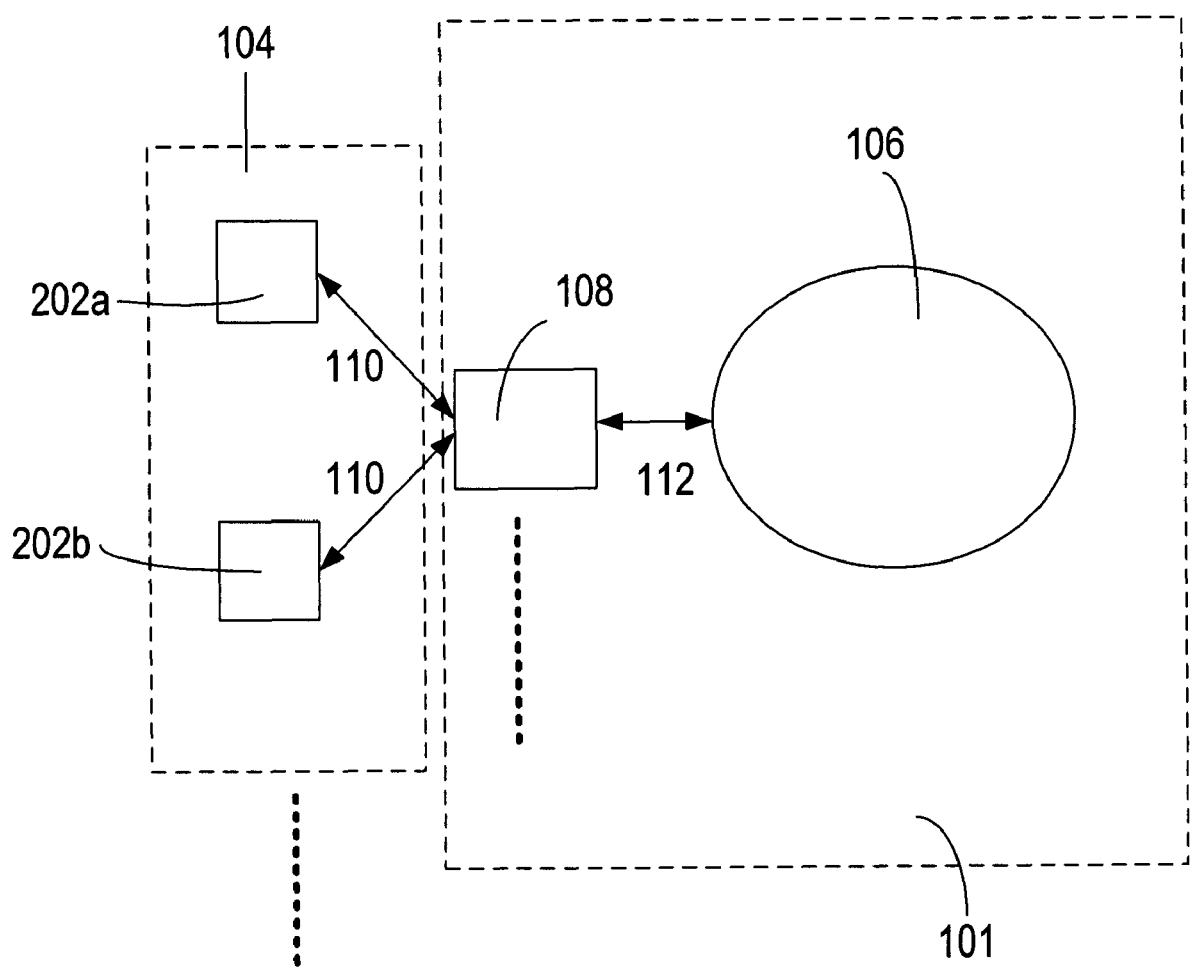
FIG. 2 shows an illustrative embodiment of a virtual platform.

FIG. 2 shows an illustrative embodiment of the invention. As shown, a hub-box 101 and automated module 104 is provided. The automated module includes automated devices 202a-b. The automated devices of the automated module, for example, cooperate together in a stage of manufacturing. The hub-box and automated devices modules are physically separated. For example, the automated module is located in the production area while the hub-box is located in another area of the facility. Locating the hub-box in the same area (e.g., production area) as the automated module is also useful. Alternatively, the hub-box can be remotely located outside the production facility.

The hub-box provides a virtual link between the cooperating automated devices. The cooperating automated devices, for example, includes a process manufacturing device 202a and a process measuring device 202b. The cooperation typically comprises producing a batch of products by the process manufacturing device followed by testing of samples from the batch by the process measuring device for qualification. If the samples fulfill requirements, the product will proceed to the next stage of production. Otherwise, it will be considered for rework or even scrapped.

Providing automated devices which cooperate to produce sub-batches of the same batch of products is also useful. For example, three tabletting machines may be provided to produce three sub-batches of the same batch. This will speed up the production of the entire batch. The hub-box compiles data from the automated devices and updates the complete production batch record. In one embodiment, the automated module comprises at least one process manufacturing and at least one process measuring device cooperating to produce sub-batches of the same batch.

The virtual link provided by the hub-box enables the automated devices to communicate with each other as well as with the hub. This facilitates control, analysis, and verification of the manufacturing process. For example, process information, such as batch number, product type, batch size, time as well as test and quality data are provided by the automated devices to the hub. Other types of processing information, such as production recipes, production stage batch status, production schedules, process start, pause and completion times, and semi-product materials information, are also useful. The information can be stored in the hub for analysis. By analyzing the data, the process can be monitored for integrity and verification. If necessary, the hub can generate control commands to adjust operational and/or process parameters of the process manufacturing device in response to improve the quality of production, thus enabling the achievement of goals stipulated in the quality plans. Furthermore, since the hub has real-time updates of the processing and measurement data, it will advantageously be able to make provisions and adjustments to the quality and capacity of production.

In one embodiment, the hub-box further comprises at least one display unit (e.g., monitor with speakers) and user-interface device (e.g., keyboard, touchpads or mouse) for communicating visual and/or audio feedback to the operator. Information, such as control parameters, status of processes, performance indicators and data analysis results, will be displayed on the display unit for providing higher transparency of the operations. An operator located at the display unit will be able to view the information and modify the operating parameters. User authentication can be provided to restrict access to designated users. In one embodiment, different levels of access may be provided to different users. For example, a supervisor may be provided with administrative rights upon logging in to change settings and view information. Other employees may be provided with restricted rights to view information related to the production processes.

Figure 3:
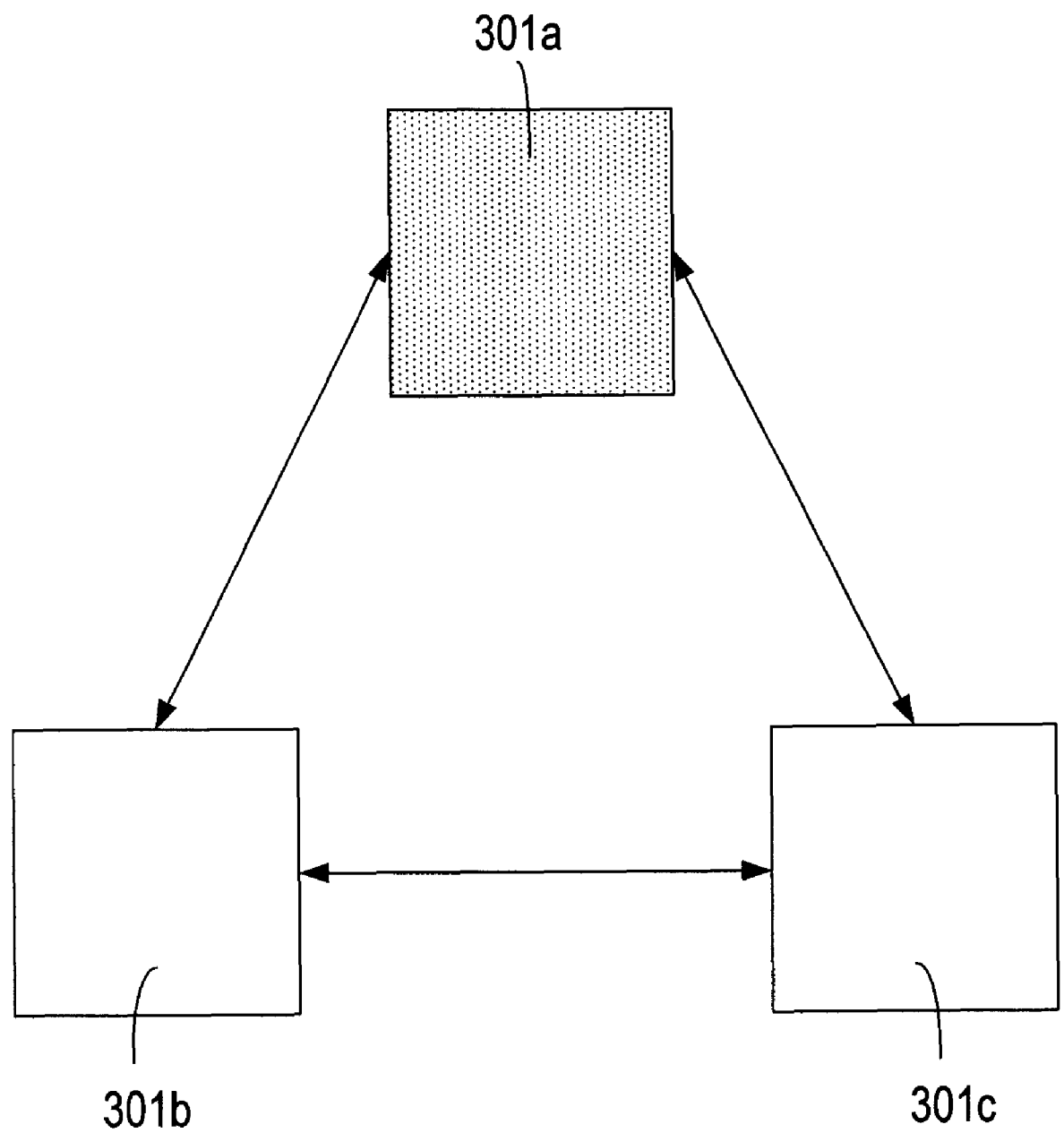
FIG. 3 shows a portion of a virtual platform in accordance with one embodiment of the invention.

FIG. 3 shows a portion of a virtual platform in accordance with one embodiment of the invention. As shown, the virtual platform includes a plurality of hub-boxes 301a-c that are interconnected for sharing information and data. Sharing control of the automated modules among the hub-boxes is also useful. In one embodiment, the hub-boxes are located in different locations. For example, the hub-boxes may be located on different floors in the same building, or they may be located in different buildings. In one embodiment, the hub-boxes are located in separate production facilities having similar automation requirements. Providing hub-boxes located in the same location is also useful. The interconnection can be provided by a distribution system such as a network system (e.g., LAN, WAN, Internet, wireless transmission or satellite communication system). Other types of interconnections to enable communication among the hub-boxes are also useful. Preferably, security features (e.g., biometrics identity verification, data encryption and user authentication) are provided to ensure the integrity and confidentiality of data.

In one embodiment, at least one of the hub-boxes serves as a redundant hub-box, providing a backup in the event of failure to one of the operating hub-boxes. Failure in an operating hub-box may be detected and the redundant hub-box can be virtually mapped to provide the required functionality. Preferably, the redundant hub-box includes automatic failure detection and mapping. Other techniques for replacing the defective hub-box after a failure, such as manual replacement, are also useful. For example, the failed hub-box hardware and/or software components (e.g., configuration files) can be removed and replaced with hardware and/or software components of the redundant hub-box. The defective hub-box can be replaced or repaired to serve as a redundant hub-box. By providing at least one redundant hub-box, interruption in the manufacturing process can be avoided or minimized.

Due to the similar configuration or automation requirements, the hub-boxes are interoperable. In one embodiment, at least one operating hub-box serves as a backup system in the event of failure of another operating hub-box. Even though one facility may have different equipment from another, the similar automation or operational requirements allows one hub-box to replace another hub-box that has failed. For example, as shown in FIG. 3, if hub-box 301a fails, one or both of the other hub-boxes 301b and 302c may take over the load of controlling operations within the facility, such as collecting, processing and storing of processing data. In yet another embodiment, the hub-boxes cooperate to produce the desired output. The hub-boxes can be easily re-designed to vary the production output to meet changes in demand. For example, the hub-box design can be scaled up/down (e.g., number and/or type of communication links) to accommodate the needs of production or facility.

In another embodiment, load balancing is provided when an operating hub-box overloads. Load balancing comprises dividing the amount of work that the hub-box has to do between two or more hub-boxes so that more work gets done in the same amount of time. Load balancing can be achieved using hardware (e.g., routers or switches), software, or a combination thereof. In one embodiment, backup of information at a hub-box is carried out periodically such that another hub-box has a copy of the critical process and control information.

The generic nature of the hub-box within the virtual platform enhances the systems adaptability to change. The virtual platform improves the efficiency of the validation process by reducing the scope of revalidation when a change in existing plans is introduced. Changes in existing plans include the addition, replacement, modification, repair and/or removal of automated devices or software components connected to the hub-box. The new automated devices can be of a different make or model from the replaced devices, or manufactured by different vendors. The system designer is able to design the automation of the facility with a wide variety of equipment without restricting to a fixed set of equipment of a particular make or model.

In one embodiment, the design of the hub-box is part of the automation design of the facility. Automation design includes the definition of production processes. For example, the production process can include granulation, drying, tabletting, coating and packaging in a pharmaceutical facility. The automation design further includes the selection, setup and configuration of hardware and software components of the hub-box, the coding of the generic interface units, the design of data structures, databases and process parameters.

Once the automation design is completed, an initial validation of the entire system is performed to verify the proposed design of the facility, systems and equipment is suitable for the intended requirements and/or purposes. Validation includes, for example, design, installation, operational and performance qualifications. Other types of qualifications are also useful.

Figure 4:
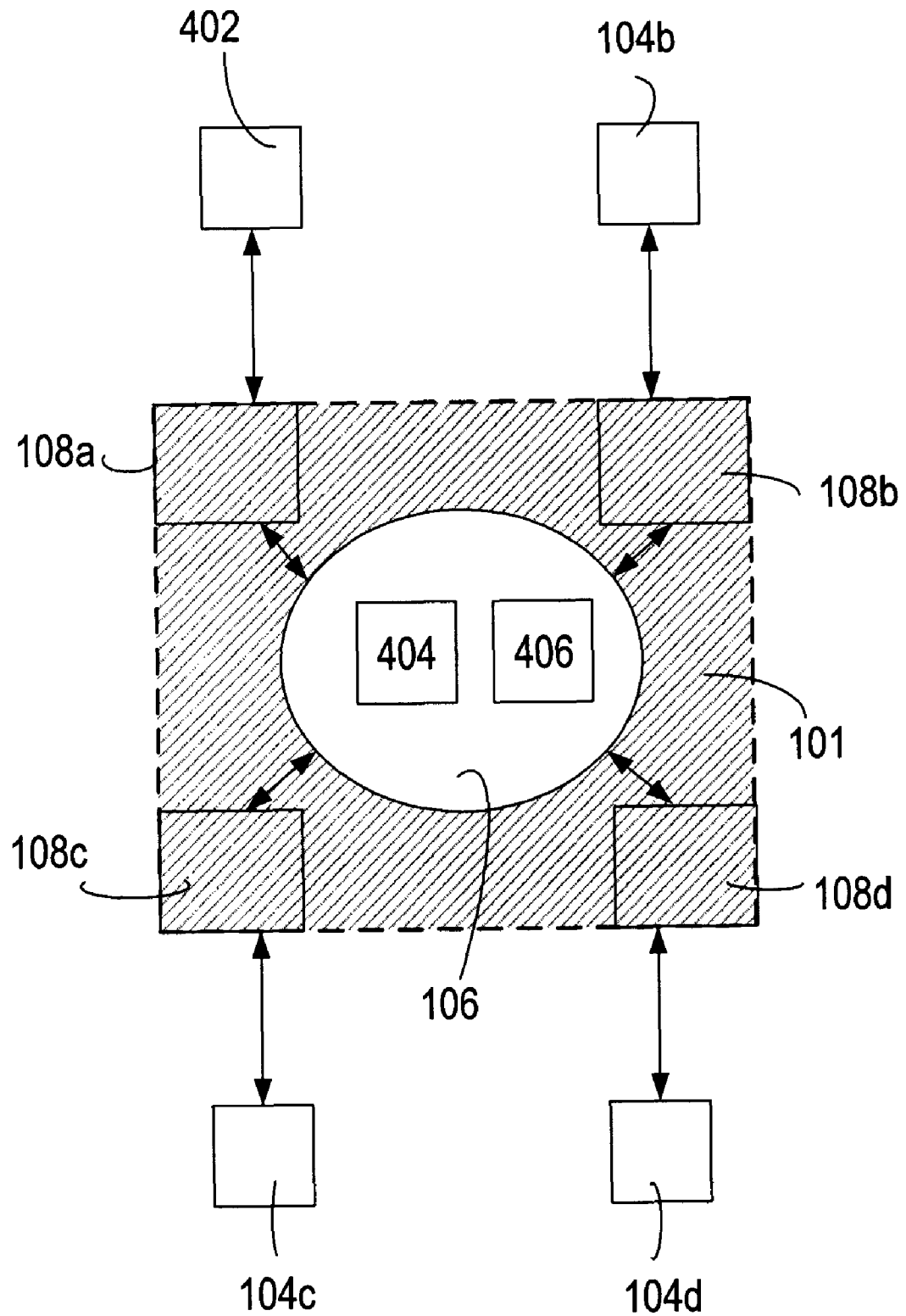
FIG. 4 shows the scope of revalidation in accordance with one embodiment of the invention.

If a change is subsequently introduced into the system and the change do not cause a substantial change in the automation design of the facility such that the automation design remains intact, the hub-box need not be revalidated. As shown in FIG. 4, the scope of revalidation is reduced to outside the hub-box 101 when a change is introduced. For example, if a coater machine 402 is replaced with a new machine of a different model, only the coater machine need to be revalidated, without revalidating the automation design in the hub-box.

Once validated, the original hub-box can be applied in another facility physically located in another location having similar automation requirements without revalidation of the automation design. Additionally, the generic automation design can be propagated to multiple facilities having the same manufacturing requirements. This allows a reduction of resources required for validation and facilitates better change controls of the facility design, hence resulting in higher efficiency, fast implementation and lower costs.

Figure 5:
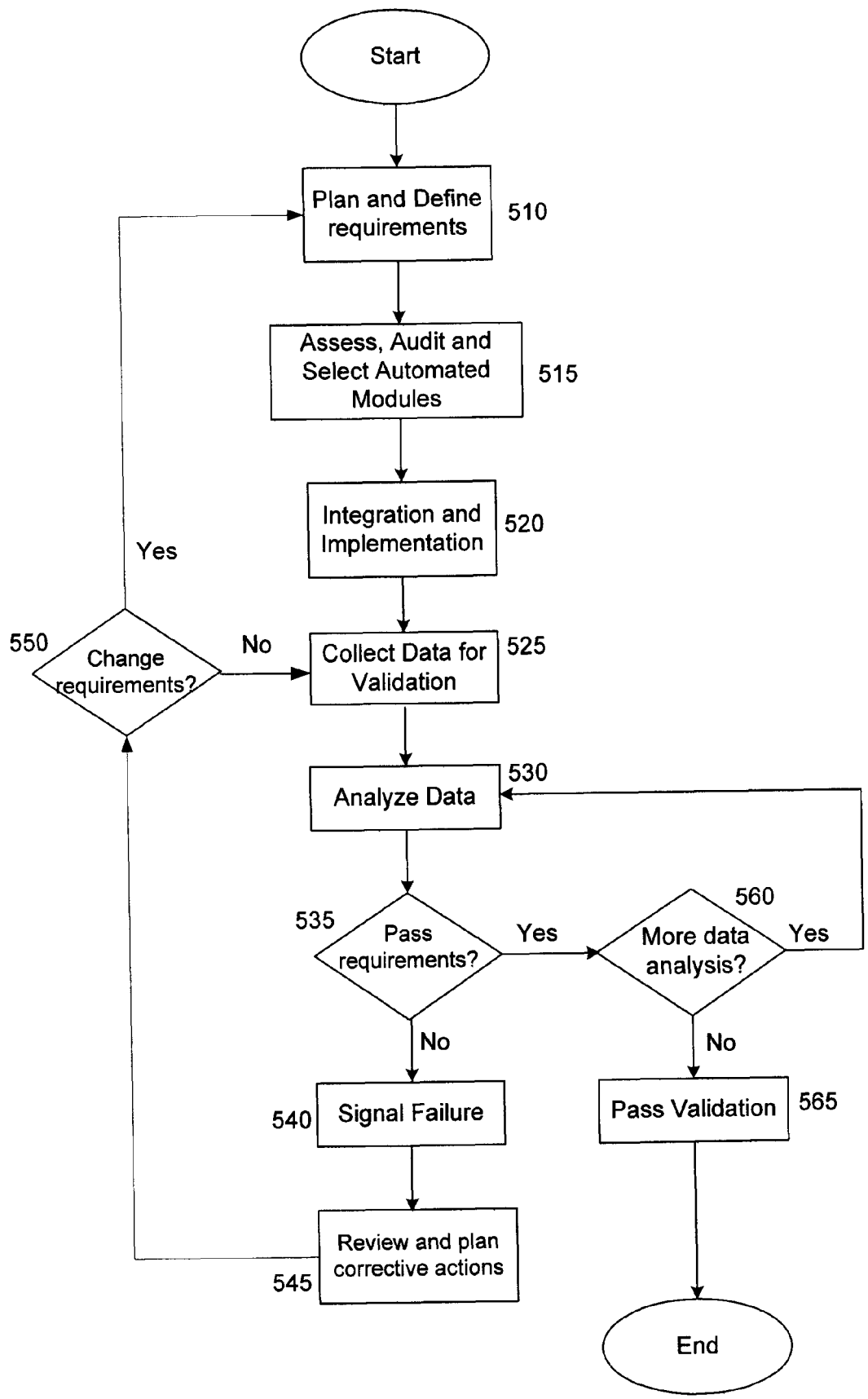
FIG. 5 shows the process of validation in accordance with one embodiment of the invention.

The hub-box facilitates the validation process by automating steps in the validation process. FIG. 5 shows a process for automating the validation process in accordance with one embodiment of the invention. The process commences by first planning and defining the requirements at step 510. The requirements include, for example, user requirements (e.g., facility operating conditions, desired output, quality, process or product specifications) and/or functional requirements (e.g., power consumption, loading, speed or capacity, environmental operating conditions, system or equipment functionalities, process results or quality parameters). Other factors or specifications can also be included in the requirements. The requirements, for example, are stored in the hub-box.

Once the automated devices have been assessed and selected at step 515, the validation proceeds to step 520 where the selected automated devices are integrated into hub-box and the production line is implemented. The hub-box facilitates the validation of the facility by monitoring the system and collecting process data at step 525. Data includes, for example, operating parameters and output parameters. Other types of data as defined by the requirements and validation process, are also useful. Data sampling rate, such as for product testing, can be varied depending on requirements.

The data is analyzed at step 530 to verify if the requirements are substantially fulfilled. For example, the relevant data is compared with relevant targets according to, for example, validation requirements. If a parameter fails to satisfy requirements (e.g., falls short of or exceeds a threshold value or fails to be within a specified range) at step 535, a validation failure would be indicated at step 540. A tolerance range may be provided to allow for slight deviation, as desired. On the other hand, if data is within the specified limits, then the system, at least with respect to that parameter being analyzed, is within the requirements.

The hub-box determines if more data analysis is required at step 560. If more analysis is required, the process returns to step 530 to perform data analysis. Additional data analysis may be required because the validation process may require analysis on numerous parameters, as specified by the requirements. In the event that the system analyzes the data or parameters sequentially, then numerous analytical iterations may be required. On the other hand, the various parameters may be analyzed in parallel. Other techniques or sequences for analyzing the data is also useful.

If no further data analysis is required and no failure is detected, the validation process is successfully completed at step 565. Data or results of the analysis can be stored in the hub-box. Once validated, no change in requirements should be permitted without proper change controls and revalidation. Preferably, the hub-box comprises safeguards to prevent unauthorized or accidental changes to the validated process and/or design. Such safeguards include, for example, version control system on records created and modified, and creating read-only records, electronic signatures for modifications. Other types of safeguards are also useful.

If, however, a failure is detected because one or more of the threshold limits is exceeded, a signal can be provided by the hub-box to indicate a failure at step 540. Audio or visual feedback, or a combination thereof, may be communicated via, for example, the display unit, to the operator. At step 545, the operator may respond by reviewing the situation and planning corrective actions to avoid the failure.

At step 550, if corrective action includes a change in requirements, the process returns to step 510 to redefine the requirements. If the corrective action does not require a change in the requirements, than the corrective action is performed and the process proceeds to step 525. Data is collected for analysis to determine if the process with the corrected action passes validation.

A change in requirements can also be brought about by a change in customer demand (e.g., product specification or output requirement) or need to improve the process. For example, more advanced technology may be available in the form of newer machines or change of production methods that can avoid such failure. The new equipment or methods may be utilized to yield better output and quality that satisfies the requirements. In the event that a change in requirements is needed for whatever reason, the process commences at 510 and proceeds until the new changes are validated.

Quality management, which in some industries includes the validation process, requires an organized set of documents defining all aspects of the system e available and approved. The documents contain information such as the change history, operating conditions of the equipment and environment, events and alarm messages, control and process parameters, measurement data or analysis results. In one embodiment, the virtual platform, with reference to the hub-box, facilitates quality management by generating some of or all of the evidentiary documents in conformance with regulatory standards. The documents comprise, for example, audit trail reports, electronic records and electronic signatures in conformance with regulations.

In accordance with another embodiment of the invention as shown in FIG. 4, the hub comprises a change database 404 that records information about changes made to the system hardware and/or software (i.e., change history). It generates electronic log files that systematically display information such as dates, times, names of personnel involved and/or textual descriptions about the changes. For example, the information may be displayed in chronological order with date and time stamps. The virtual platform, with reference to the hub-box, updates the change database each time a change is introduced into the system. Access to the log files is controlled to prevent unauthorized copying, renaming, amendment and deletion of the files. These log files will be used extensively in, for example, audits, regulatory inspection or validation processes.

In one embodiment, the hub 106 comprises a manufacturing information database 406 that records information related to the manufacturing processes. Manufacturing information includes, for example, measurement data received from the equipment, analysis results, and control and process parameters. The manufacturing information may be presented using statistical graphs, charts or tables. Other forms of representation are also useful.

In one embodiment, the virtual platform provides remote access by an authorized external party. The external party may be located in a different physical location from the facility. The external party, in one embodiment, comprises an inspector or observer from a regulatory agency who wishes to inspect and audit the manufacturing facility. For example, in some regulated industries (e.g., pharmaceuticals), inspection by regulatory authorities on a regular basis is mandatory. Access to manufacturing records such as electronic log files recording the change history and manufacturing information stored in the manufacturing information database, may be provided to the inspector for review.

The hub-box can also facilitate asset management of the facility by listing and storing the records of automation modules employed in the management information database for strategic, financial and operational planning. Such information is collected, processed and stored continuously in real-time with the daily operations of the facility.

In another embodiment, the external party comprises a customer who wishes to monitor the manufacturing progress and status of their contracted products. The customer may access real-time information of the production line, such as the production output rate, in-process control parameters r quality of the intermediate products. By monitoring the production, they will have the capability to be able to, for example, estimate the time of completion, volume of output and/or plan for the release of their products for sale in the market.

In yet another embodiment, the external party comprises a sales representative of the facility who wishes to monitor the manufacturing progress and status of their customers' contracted products. The sales representative may remotely log into the virtual platform at the customers office or at other locates to access real-time information upon request (e.g., manufacturing status and progress, quantity and quality). In another embodiment, the external party comprises a vendor or technician of the manufacturing equipment. The vendor or technician may wish to remotely access the real-time production information to perform troubleshooting and maintenance controls of their equipment.

In one embodiment, remote access is provided using a network system such as the internet or satellite communication system. An external interface may be provided to allow the external party to remotely log into the virtual platform. The external interface, in one embodiment, comprises a website that is accessible using an internet browser. The external interface, in another embodiment, can be displayed in digital processing systems. Other types of interfaces, such as electronic and/or mobile devices, are also useful. Preferably, the external interface restricts access to control operations of the virtual platform. More preferably, data integrity and confidentiality are maintained using security measures such as user authentication and data encryption algorithms.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

The invention claimed is:

1. A method of automating validation of a manufacturing process, comprising:
   defining requirements;
   selecting automated manufacturing devices for manufacturing;
   integrating the automated manufacturing devices in a production line, wherein integrating the automated manufacturing devices comprises interconnecting the automated manufacturing devices to a hub-box via communication links, the hub-box operationally controls and facilitates communication between automated manufacturing devices and validation of the manufacturing process, wherein the validation includes generating an organized set of documents defining aspects of the process, in conformance with regulatory standards;
   providing at least one generic interface unit communicatively coupled between a hub of the hub box and an automated manufacturing device, wherein said generic interface unit comprises a plurality of communication links employing different communication protocols;
   collecting processing data from the automated manufacturing devices by the hub for analysis;
   analyzing the processing data to determine whether the requirements are satisfied; and
   validating the manufacturing process if the requirements are satisfied.

2. The method of claim 1 further comprises communicating, by the generic interface unit, with the automated manufacturing device using a first communication protocol and communicating, by the generic interface unit, with the hub using a second communication protocol.

3. The method of claim 2 wherein said first communication protocol comprises FieldBus, CANbus, Modbus, BITBUS, WorldFIP, Profibus, MAP or a combination thereof.

4. The method of claim 2 wherein said second communication protocol comprises Ethernet, TCP/IP communication protocol or a combination thereof.

5. The method of claim 2 further comprises:
   detecting, by the hub, the first communication protocol; and
   translating, by the hub, instructions or information so that the hub can communicate with the automated manufacturing device.

6. The method of claim 1 wherein the requirements are user requirements or functional requirements.

7. The method of claim 6 wherein the user requirements are facility operating conditions, desired output, quality, process or product specifications.

8. The method of claim 6 wherein the functional requirements are power consumption, loading, speed or capacity, environmental operating conditions, system or equipment functionalities, process results or quality parameters.

9. The method of claim 1 wherein the documents contain information relating to change history, operating conditions, events, alarm messages, control parameters, process parameters, measurement data or analysis results.

10. The method of claim 1 wherein the documents are audit trail reports, electronic records or electronic signatures.

11. A method of automatic validation of a manufacturing process, comprising:
    defining requirements;
    selecting automated manufacturing devices of a module for manufacturing, wherein the module forms a stage of a production line;
    integrating the automated manufacturing devices in a production line, wherein integrating the automated manufacturing devices comprises interconnecting the automated manufacturing devices to a hub-box via communication links, the hub-box operationally controls and facilitates communication between automated manufacturing devices and validation of the manufacturing process, wherein the validation includes generating an organized set of documents defining aspects of the process, in conformance with regulatory standards;
    providing at least one generic interface unit communicatively coupled between a hub of the hub box and an automated manufacturing device, wherein said generic interface unit comprises a plurality of communication links employing different communication protocols;
    collecting processing data from the automated manufacturing devices by the hub for analysis;
    analyzing the processing data to determine whether the requirements are satisfied; and
    validating the manufacturing process if the requirements are satisfied.

12. The method of claim 11 wherein the automated manufacturing devices of the module comprises:
    an automated manufacturing device;
    an automated measuring device; and
    an automated storage device for storage of in-process production material.

13. The method of claim 11 further comprises communicating, by the generic interface unit, with the automated manufacturing device using a first communication protocol and communicating, by the generic interface unit, with the hub using a second communication protocol.

14. The method of claim 13 wherein said first communication protocol comprises FieldBus, CANbus, Modbus, BITBUS, WorldFIP, Profibus, MAP or a combination thereof.

15. The method of claim 13 wherein said second communication protocol comprises Ethernet, TCP/IP communication protocol or a combination thereof.

16. The method of claim 13 further comprises:
detecting, by the hub, the first communication protocol; and
translating, by the hub, instructions or information so that the hub box hub can communicate with the automated manufacturing device.

17. The method of claim 11 wherein the requirements are user requirements or functional requirements.

18. The method of claim 11 wherein the documents contain information relating to change history, operating conditions, events, alarm messages, control parameters, process parameters, measurement data or analysis results.

19. The method of claim 11 wherein the documents are audit trail reports, electronic records or electronic signatures.

20. A method of automatic validation of a manufacturing process, comprising:
defining requirements;
selecting automated manufacturing devices of a module, wherein the module forms a stage of a production line, the automated manufacturing devices of the module comprises:
an automated manufacturing device;
an automated measuring device; and
an automated storage device for storage of in-process production material;
integrating the automated manufacturing devices in a production line, wherein integrating the automated manufacturing devices comprises interconnecting the automated manufacturing devices to a hub-box via communication links, the hub-box operationally controls and facilitates communication between automated manufacturing devices and validation of the manufacturing process, wherein the validation includes generating an organized set of documents defining aspects of the process, in conformance with regulatory standards;
providing at least one generic interface unit communicatively coupled between a hub of the hub box and an automated manufacturing device, wherein said generic interface unit comprises a plurality of communication links employing different communication protocols;
collecting processing data from the automated manufacturing devices by the hub for analysis;
analyzing the processing data to determine whether the requirements are satisfied; and
validating the manufacturing process if the requirements are satisfied.

* * * * *